J. C. Covert,

Harness,

N° 69,412.                Patented Oct. 1, 1867.

Witnesses:
Theo Tusche
Wm Trevvi

Inventor:
Jas C Covert
Per Munn
Attorneys

United States Patent Office.

JAMES C. COVERT, OF TOWNSENDVILLE, NEW YORK.

Letters Patent No. 69,412, dated October 1, 1867.

IMPROVED HOLD-BACK.

The Schedule referred to in these Letters Patent and making part of the same.

TO ALL WHOM IT MAY CONCERN:

Be it known that I, JAMES C. COVERT, of Townsendville, Seneca county, New York, have invented a new and improved Hold-Back; and I do hereby declare that the following is a full, clear, and exact description thereof, which will enable others skilled in the art to make and use the same, reference being had to the accompanying drawings, forming a part of this specification, in which—

Similar letters of reference indicate corresponding parts.

Figure 1:
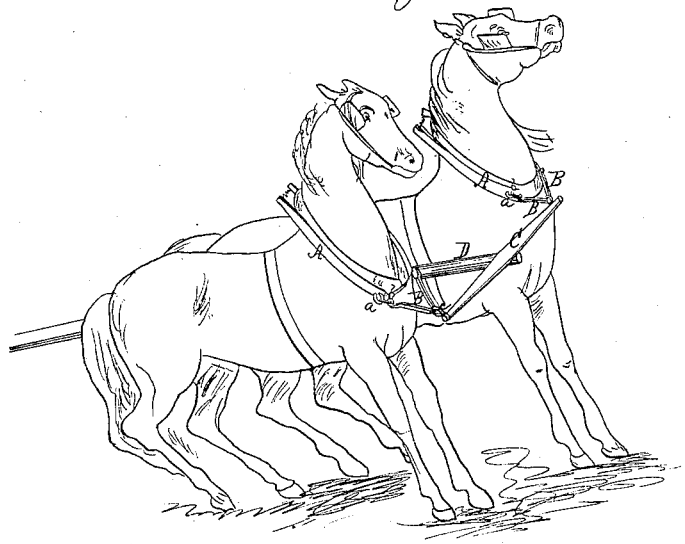
Figure 1 is a perspective view of my invention, showing it applied to a team.
Figure 2:
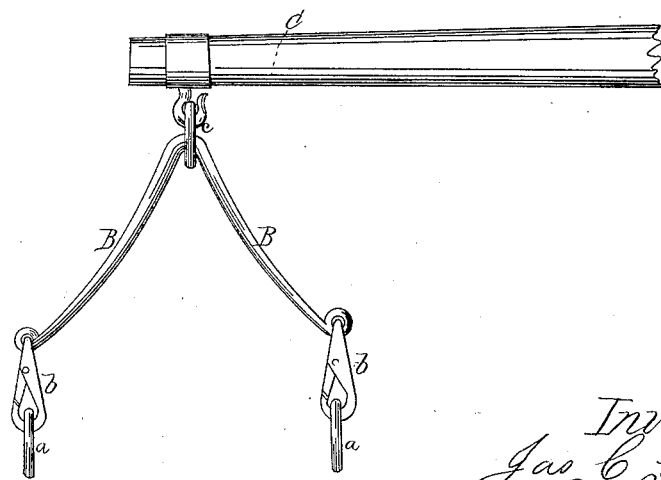
Figure 2 is a plan or top view of the same.

This invention relates to an iron hold-back, to be attached to the lower parts of the frames, and which is connected by a ring to the neck-yoke, for the purpose of doing away with the breast-strap, and to facilitate the easy adjustment of the harness, and the management of the vehicle.

The invention consists chiefly in the shape of the hold-back, which is similar to the letter V, whereby the ring of the neck-yoke is more securely held in place, and prevented from sliding on the hold-back, thus permiting greater facility in guiding the vehicle. The ends of the hold-back are secured to the rings in the harness by means of snap-hooks, and the hold-back can thus be easily secured to or removed from the harness.

A represents the harness made as usual. To their lower parts are attached rings or eyes $a$ $a$, to which, by means of snap-hooks $b$ $b$, the hold-back B is secured. The latter is made of malleable iron or other suitable metal, in the form of a V-shaped bar, as is shown in the drawings. The ring $c$ is attached in any suitable manner to the end of the V-shaped strap B, and will thus slip less thereon than on the usual or curved metallic hold-backs, and thus a more secure and complete guidance of the pole D will be effected.

I claim as new, and desire to secure by Letters Patent—

The metallic hold-back constructed as described, consisting of the V-shaped strap B attached at its angle by a ring, $c$, to the neck-yoke, and at its ends by the snap-hooks $b$ to the rings $a$ of the harness, as herein shown and described.

JAMES C. COVERT.

Witnesses:
WM. F. MCNAMARA,
ALEX. F. ROBERTS.